(12) United States Patent
Macklin et al.

(10) Patent No.: US 6,658,079 B1
(45) Date of Patent: Dec. 2, 2003

(54) SYSTEM, METHOD AND APPARATUS FOR MEASURING WALKING AND RUNNING DISTANCE

(75) Inventors: Lee Macklin, Colorado Springs, CO (US); Jessica Kraemer, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/206,109

(22) Filed: Jul. 29, 2002

(51) Int. Cl.$^7$ ............................................... G01C 21/00
(52) U.S. Cl. ....................... 377/24.2; 702/159; 702/160
(58) Field of Search ......................... 377/24.2; 702/159, 702/160

(56) References Cited

U.S. PATENT DOCUMENTS 6,243,659 B1 * 6/2001 Dominici et al. ........... 702/160

* cited by examiner

*Primary Examiner*—Margaret R. Wambach

(57) ABSTRACT

An electronic pedometer to accurately measure stride length of a walker includes a processing unit with an ultrasonic sound wave receiver attached to one foot and an ultrasonic sound wave generator attached to the other foot. Pressure sensitive switches close when each foot makes a step, providing signals to the processing unit to record the number of strides. The processing unit computes stride length by calculating distances using the ultrasonic sound waves.

19 Claims, 4 Drawing Sheets

SYSTEM, METHOD AND APPARATUS FOR MEASURING WALKING AND RUNNING DISTANCE

TECHNICAL FIELD

The technical field relates to pedometers and more particularly to a pedometer that can measure the distance a user walks or runs by accurately measuring the stride the user takes.

BACKGROUND

Pedometers have been in use for many years and most indirectly measure the distance traveled by the user by counting the number of steps taken. The user preprograms a stride distance into the device and then by calculating the number of strides taken multiplied by the predetermined stride length, a distance is recorded by the pedometer. Such pedometers have a drawback, however, in that during the course of a run or walk, the user may not take a stride which is equal to the preset stride distance. Accordingly, only a rough approximation of the distance traveled can be made by these pedometers.

In addition, prior art pedometers also rely on a number of techniques to count the number of steps taken by the user. Most of these techniques rely on a change in acceleration each time a user's foot contacts the ground. These changes are detected by a number of different acceleration sensitive devices. All of these devices rely on mechanical means to both count the number of steps or strides taken and to determine the distance of each stride.

These prior art pedometers have limitations which result in inaccurate data. For example, using the assumption that a stride length is constant results in errors in distance measurement because actual stride length may vary considerably as a function of the terrain traversed and the speed at which the user is traveling.

Further, the use of mechanical devices for sensing and counting steps is unreliable under the varied conditions of running, jogging and walking.

SUMMARY

In one embodiment an electronic pedometer is used to measure the stride length of a user. The pedometer has a first unit associated with one foot of the user including a pressure sensitive switch and a sound wave generator. The pedometer also includes a second unit associated with the second foot of the user including a pressure sensitive switch and a sound wave receiver. A processor is used to process sensed signals from each of the pressure sensitive switches and the sound wave generator. The processor is programmed to count each activation of the pressure sensitive switches and determines a point of maximum signal strength received from the sound wave generator. The processor also calculates the distance between the point of sensed maximum signal strength and the sound wave receiver, and the distance between activation of the pressure sensitive switch of the first unit and the last activation of the pressure sensitive switch of the second unit. The measurements calculated by the processor are used to calculate the stride length of the user.

In another embodiment a system is used to determine a distance traveled. The system uses an emitter for emitting a signal associated with one foot of the user and a signal sensor associated with the second foot of the user for receiving the emitted signal. The system also uses a processor for processing signals and calculating the stride length of the user.

DESCRIPTION OF THE DRAWINGS

The detailed description will refer to the following drawings, wherein like numerals refer to like elements, and wherein.

DETAILED DESCRIPTION

Figure 1:
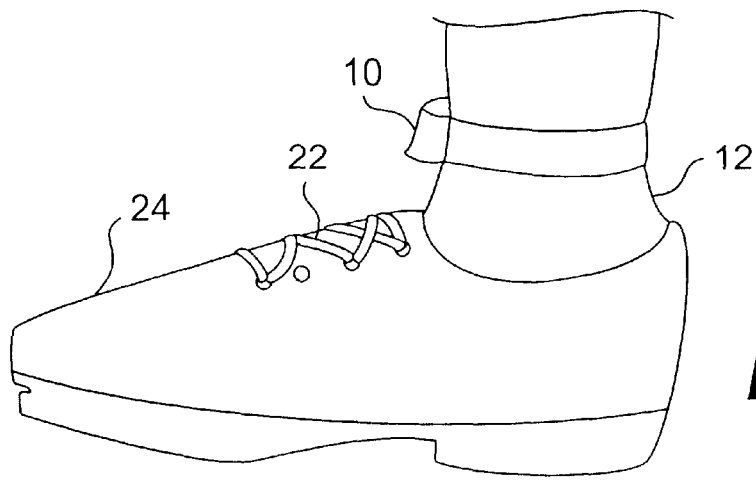
FIG. 1 illustrates a foot of a user with an embodiment of a processing unit in accordance with the present invention strapped to the ankle of the user.

In operation, the electronic pedometer calculates stride length electronically. A pressure sensitive switch, which may be embedded in an insole, inserted in a shoe, or located in the shoe itself, is activated each time pressure is applied during a walk or a run. The pressure sensitive switch may be disposed under the balls of the user's foot so that each time pressure is applied by the weight of the user on the ball of the foot a signal is sent to an electronic recording device. The pressure sensitive switches may be disposed in each shoe of the user and are connected to receiving devices which may be attached to the shoe or strapped about the ankle of the user.

One of the pressure sensitive switches may be connected to a sound wave generator which continuously emits ultrasonic waves during use. The other pressure sensitive switch may be connected to a receiving device which includes, among other electronic circuitry, an ultrasonic wave receiver to receive the waves emitted by the other device. Each time the pressure sensitive device associated with the ultrasonic wave generator is closed by the application of pressure, the generation of the ultrasonic waves is interrupted and can be recorded.

The other pressure sensitive switch may be connected to a main processing component which includes an ultrasonic sound wave receiver and a processor which records each time the pressure sensitive switch associated with the left foot and the pressure sensitive switch associated with the right foot is activated. A temperature sensor is included in the processor, and based on the speed of sound which is dependent upon temperature, the stride length is calculated and displayed on the display module associated with the processor unit.

The pedometer may operate according to the following sequence: if the main processing unit is associated with the left foot when the pressure sensitive switch of the left foot closes, a signal is sent to the processor. Simultaneously, the ultrasonic sound generator associated with the right foot sends ultrasonic sound waves to the receiver in the processor which senses the strength of the signal. As the right leg moves forward, the ultrasonic sound generator attached on the right foot sends ultrasonic sound signals to the receiver and the strength of the signal increases until it is at a point directly opposite the receiver and then recedes in strength as the right leg continues in its forward path. As the right leg continues in its path, the signal recedes in strength, thus the processor senses the maximum signal strength and records this incidence. When the right foot is placed in contact with the ground surface, the pressure sensitive switch is activated and again this event is recorded by the processor. A temperature sensor is provided to account for the varying speed of sound. The distance between the right foot and left foot at the point of maximum single strength can be calculated as well as the distance between the right foot and the left foot when the pressure sensitive switch of the right foot is activated. With the distance between the feet being calculated when maximum signal strength is sensed and the distance between the left foot and the right foot at the maximum extension of the right foot also being calculable, the processor calculates the distance between the point of maximum signal strength and the point where the pressure sensitive switch associated with the right foot impacts the surface being walked. By doubling this distance, the stride length is accurately calculated.

Figure 2:
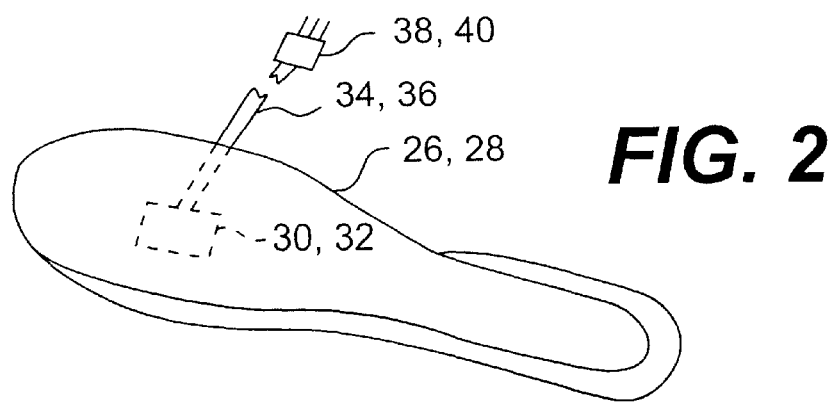
FIG. 2 is a perspective view of an embodiment of an insole in accordance with the present invention provided with a pressure sensitive switch.

The embodiments of the system, method and apparatus for measuring walking and running distance will now be described in detail with reference to the following figures. With reference now to FIGS. 1 and 2, the pedometer includes a processing unit 10 which may be strapped to the ankle 12 of a user by straps 14 and 16 which are provided at each end with hook and loop fastener, such as, for example, Velcro®, securing elements 18 and 20 (See FIG. 3). Alternatively, the processing unit 10 may be affixed in any convenient manner to laces 22 of the user's shoe 24.

An insole 26, 28 for each shoe 24 is provided and includes a pressure sensitive switch 30, 32, respectively, for each insole, connected by an electrically conductive conduit 34, 36, respectively, for each shoe to a plug 38, 40, respectively, for each shoe. The plugs 38 and 40 have electrically conductive prongs for insertion to their respective processing unit 10 or ultrasonic sound generator 42 (see FIG. 4).

Figure 3:
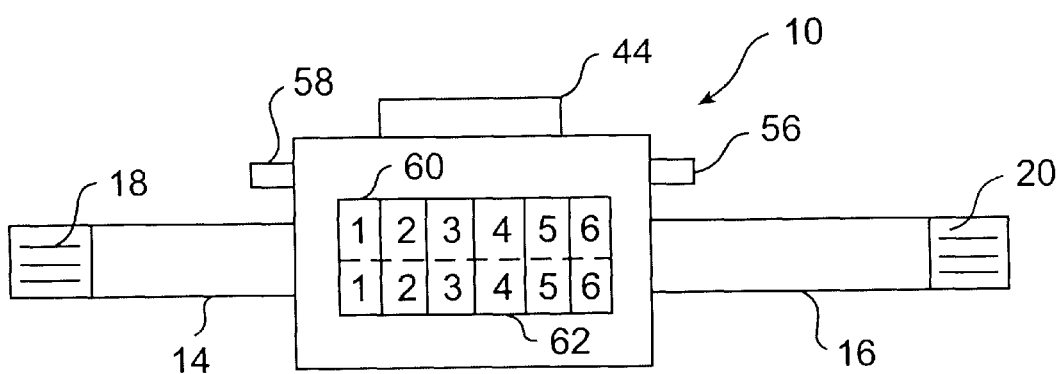
FIG. 3 is a plan view of the processing unit of FIG. 1.
Figure 4:
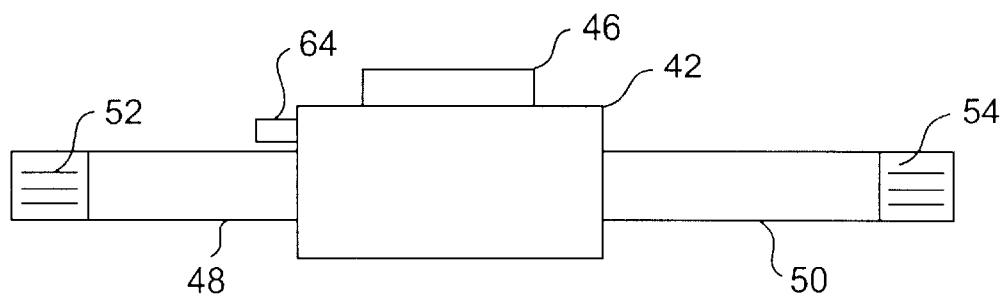
FIG. 4 is a plan view of an embodiment of a ultrasonic sound generator in accordance with the present invention.

FIG. 3 is a plan view of the processing unit 10 which can be strapped to the ankle of the user or to the shoe in any suitable manner. FIG. 4 is a plan view of the ultrasonic sound generator 42 which can also be strapped around the ankle of the user or to the shoe in any suitable manner. The plug 38, 40 is inserted into receptacle 44 on the processing unit 10 and into the receptacle 46 on the ultrasonic sound generator 42. Ultrasonic sound generator 42 is also provided with straps 48 and 50 provided with hook and loop attachment members 52 and 54, respectively, for securement to the foot of a user. Processing unit 10 is provided with an on/off switch 56 and a reset switch 58 as well as a digital display indicator panel 60 which records distance traveled and a digital display 62 which records total distance traveled. The processor unit 10 also includes a temperature sensor 74 with the temperature reading being programmable within the processing unit 10 to calculate the distance between the left foot and the right foot. During the movement from the left foot and the right foot, the ultrasonic sound generator 42 emits ultrasonic waves which are received by an ultrasonic sound receiver 110 (illustrated in FIG. 6A) within the processing unit 10. The ultrasonic generator 42 may be provided with an on/off switch 64.

Figure 5:
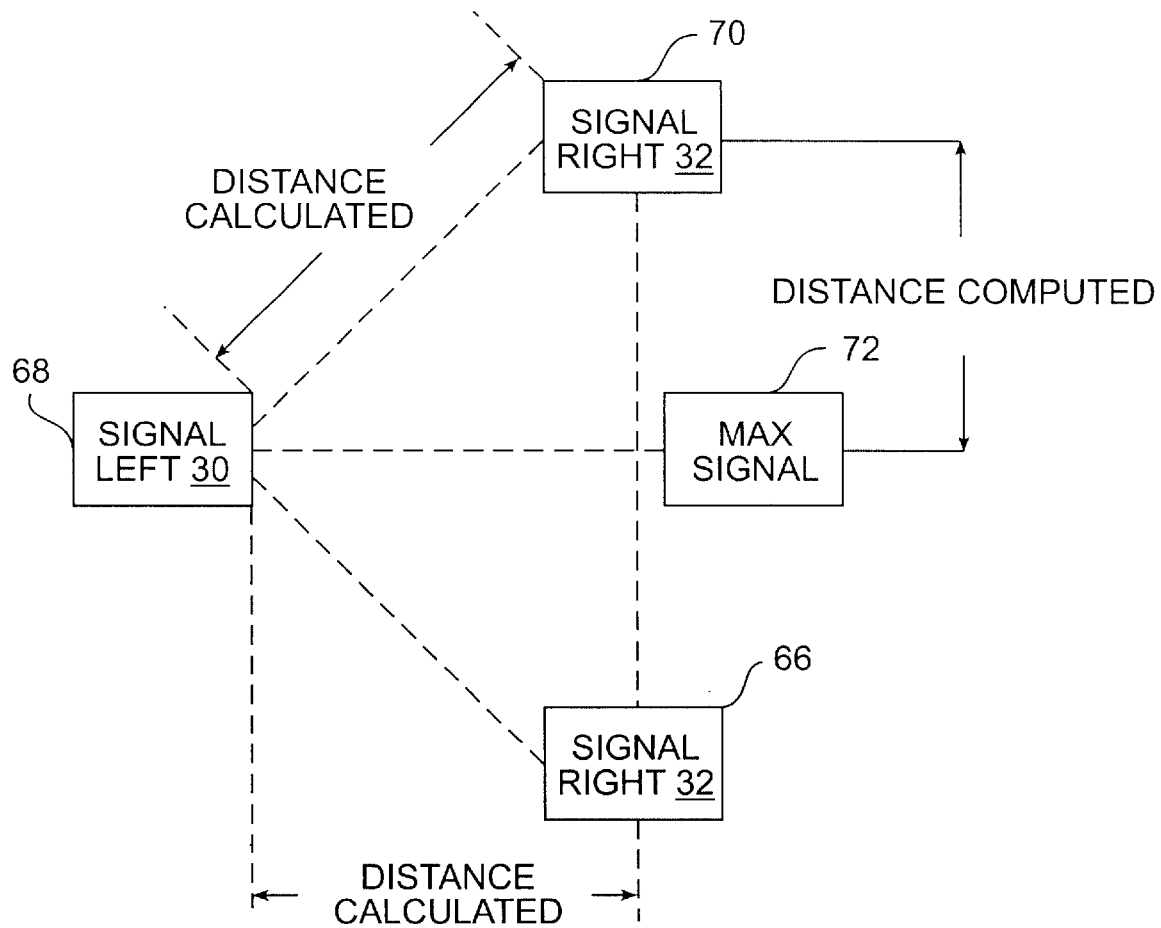
FIG. 5 is a diagrammatic view showing calculations of the distance traveled using the pedometer of the present invention.

Referring to FIG. 5, the operation of the pedometer will now be explained. FIG. 5 represents one sequence of a walking or running mode for the user. The sequence would be the right foot indicated on the right side of FIG. 5 at 66 as the completion of a stride, followed by an impact of the left foot to close pressure sensitive switch 30, indicated at 68 and the movement of the right foot in a forward direction until impact and closure of the pressure sensitive switch 32, indicated at 70. During the stride as the right foot moves from position 66 to position 70, it moves in a forward path and reaches a point 72 midway between the initiation of the stride 66 and the completion of the stride 70. During this movement the ultrasonic sound generator 42 emits ultrasonic waves received by the ultrasonic sound receiver 110. The shortest distance between processing unit 10 and ultrasonic generator 42 is at point 72 where ultrasonic generating unit 46 is directly opposite processing unit 10. At this point, the signal strength will be strongest since the distance is shortest and the processor senses the maximum signal output and calculates the distance between the left foot and the right foot as indicated in FIG. 5. Since the ultrasonic sound waves move at the speed of sound and are temperature sensitive, input from the temperature sensor 74 (illustrated in FIG. 6A) is used by the processor 10 in calculating the distance between the left foot and the right foot when the right foot is at the position 72 and the left foot is at position 68.

It should be understood that a variety of energy generation devices may be employed to transmit the requisite signals. In one embodiment, the generation device may be an ultrasound generator which emanates ultrasonic waves from a transmission point generally outwards. These ultrasonic waves are then detected from a receiver in close proximity to the generation device regardless of the orientation of the generation and receiver devices.

As the right foot continues it's stride, when the weight on the right foot closes pressure sensitive switch 32 at position 70, the ultrasonic sound generator 42 is interrupted and the interruption in the signal is received by the processor 10, which then calculates the distance the right foot is at position 70 from the left foot. With the distance between positions 68 and 72 being calculated and the distance between positions 68 and 70 also being calculated, the distance between position 72 and 70 can be calculated since, as seen in FIG. 5, a right triangle is formed and the computed distance may be readily calculable using the Pythagorean theorem, i.e., the formula $a^2+b^2=c^2$, where "a" is the known distance between positions 68 and 72 (a side) and "c" is the known distance between positions 68 and 70 (the hypotenuse).

Figure 6A:
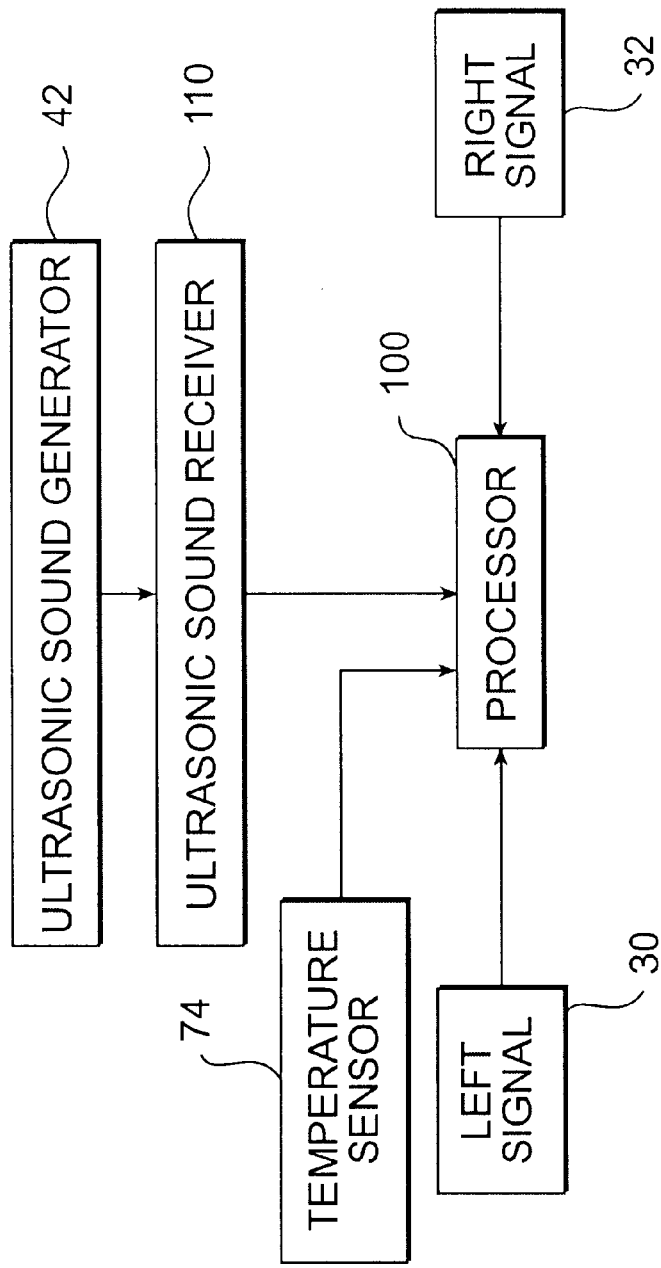
FIG. 6A is a block diagram of an embodiment of the present invention illustrating the interaction of components of the pedometer.

Reference is now made to FIG. 6A which, in block diagram form, illustrates the interaction of components of the pedometer. Ultrasonic sound waves from generator 42 are received in processor 10. As discussed, processor 10 may be located in the ultrasonic sound receiver 110. These signals are sent to the processor 10 as well as signals representative of the sensed temperature by temperature sensor 74. Signals are also sent upon the closure of pressure sensitive switch 30 in the left shoe and pressure sensitive switch 32 in the right shoe. By sequentially counting the closure of pressure sensitive switch 30 and pressure sensitive switch 32, the processor 10 determines each step taken.

Figure 6B:
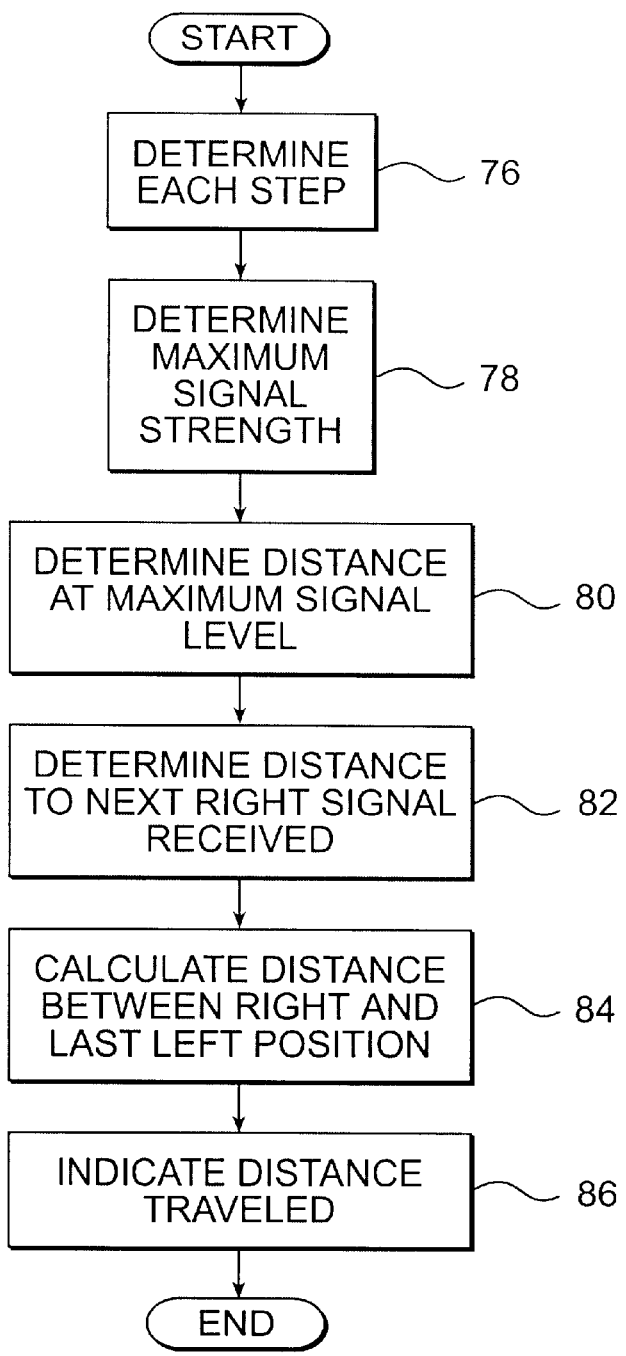
FIG. 6B is a flow chart of an embodiment of the present invention illustrating operation for determining distance traveled.

FIG. 6B is a flowchart illustrating the functionality of the processor unit 10. Initially, the processor unit 10 determines each step (block 76), as discussed with respect to FIG. 5. As explained above, the processor 10 continually monitors the strength or amplitude of the ultrasonic sound being received by receiver 110 and determines the point of maximum signal strength (block 78). Once the maximum signal strength has been detected, the processor 10 determines the distance between the user's left foot and right foot at the maximum signal strength point (block 80). The next time the right foot applies sufficient pressure to close pressure sensitive switch 32, a signal is sent to the processor 10 and the processor 10 determines the distance from the point at which pressure sensitive switch 32 was closed to the last point at which pressure sensitive switch 30 associated with the left shoe was closed (block 82). The processor 10 then calculates the distance between the point the pressure sensitive switch 32, associated with the right foot is closed, and the last position indicated by the closure of pressure sensitive switch 30, associated with the left shoe was sensed (block 84). Based on these calculated distances, as shown in FIG. 5, the distance between the point of maximum signal strength and the next closure of pressure sensitive switch 32 may be calculated. The calculated distance can be doubled to indicate the distance traveled by one stride (block 86).

The terms and descriptions used herein are set forth by way of illustration only and are not meant as limitations. Those skilled in the art will recognize that many variations are possible within the spirit and scope of the disclosure as defined in the following claims, and their equivalents, in which all terms are to be understood in their broadest possible sense unless otherwise indicated.

What is claimed is:

1. An electronic pedometer to measure stride length of a user comprising:

a first unit associated with a first foot of the user including a pressure sensitive switch and a sound wave generator;

a second unit associated with a second foot of the user including a pressure sensitive switch and a sound wave receiver;

a processor to process sensed signals from each said pressure sensitive switch and said sound wave generator, said processor being programmed to count each activation of said pressure sensitive switches and to determine a point of maximum signal strength received from said sound wave generator, and said processor being programmed to calculate a distance between the point of sensed maximum signal strength and said sound wave receiver, and a distance between activation of the pressure sensitive switch of said first unit and a last activation of the pressure sensitive switch of said second unit to thereby calculate stride length.

2. The electronic pedometer of claim 1, wherein each said pressure sensitive switch is positioned below a ball of each foot of the user.

3. The electronic pedometer of claim 1, wherein each said pressure sensitive switch is positioned within an insole insertable within a shoe.

4. The electronic pedometer of claim 1, wherein each said unit is provided with means for attachment to a user.

5. The electronic pedometer of claim 1, wherein said processor is within said second unit.

6. The electronic pedometer of claim 5, including a digital display to indicate the cumulative stride length traveled by a user.

7. The electronic pedometer of claim 1, including a temperature sensor to detect signals representing a sensed temperature.

8. The electronic pedometer of claim 1, wherein the distance between activation of the pressure sensitive switch of said first unit and the last activation of the pressure sensitive switch of said second unit is doubled to calculate total stride length.

9. The electronic pedometer of claim 1, wherein the Pythagorean theorem is used to calculate stride length.

10. A method for measuring a distance traveled by a user, said method comprising the steps of:

sensing each time a foot of said user contacts a surface;

emitting a signal from a signal emitter associated with one foot of the user, wherein said emitted signal is an ultrasonic sound wave;

receiving the emitted signal in a signal sensor associated with the second foot of the user;

processing signals representative of each surface contact and said emitted signal in a processor, wherein said, processor senses an amplitude of said emitted signal; and calculating a stride length of the user based on said emitted signal and said surface contact.

11. The method of claim 10, wherein said processor senses a maximum amplitude of said emitted signal and said processing includes calculating a distance between the user's feet at the maximum signal amplitude.

12. The method of claim 11, including the step of calculating the distance between a user's feet on successive sensing of contact to thereby calculate a stride length of a user.

13. The method of claim 12, including the step of using the Pythagorean theorem to calculate stride length.

14. The method of claim 10, including the step of adding a number of strides to obtain a distance traveled.

15. The method of claim 10, wherein said signal is a continuous signal.

16. A system for measuring a distance traveled, said system comprising:

an emitter for emitting a signal associated with one foot of a user;

a signal sensor associated with the second foot of the user for receiving the emitted signal; and a processor for processing signals, including emitted signals, wherein the emitted signals are representative of each surface contact and wherein said processor:
        is alerted each time a foot of the user contacts a surface, calculates a stride length of the user using said emitted signal, and determines a point of maximum signal strength received from said emitter.

17. The system of claim 16, wherein the Pythagorean theorem is used to calculate stride length.

18. A system for measuring a distance traveled, said system comprising:

an emitter for emitting a signal associated with one foot of a user;

a signal sensor associated with the second foot of the user for receiving the emitted signal;

a processor for processing signals representative of said emitted signal, wherein said processor calculates a stride length of the user using said emitted signal; and a sensor for sensing a temperature.

19. The system of claim 18, wherein the sensed temperature is used in a calculation to compensate for variations in the speed of sound.

* * * * *